March 24, 1959  J. B. FENN  2,878,644
SONIC VELOCITY SUBMERGED COMBUSTION BURNER
Filed May 1, 1956  2 Sheets-Sheet 1
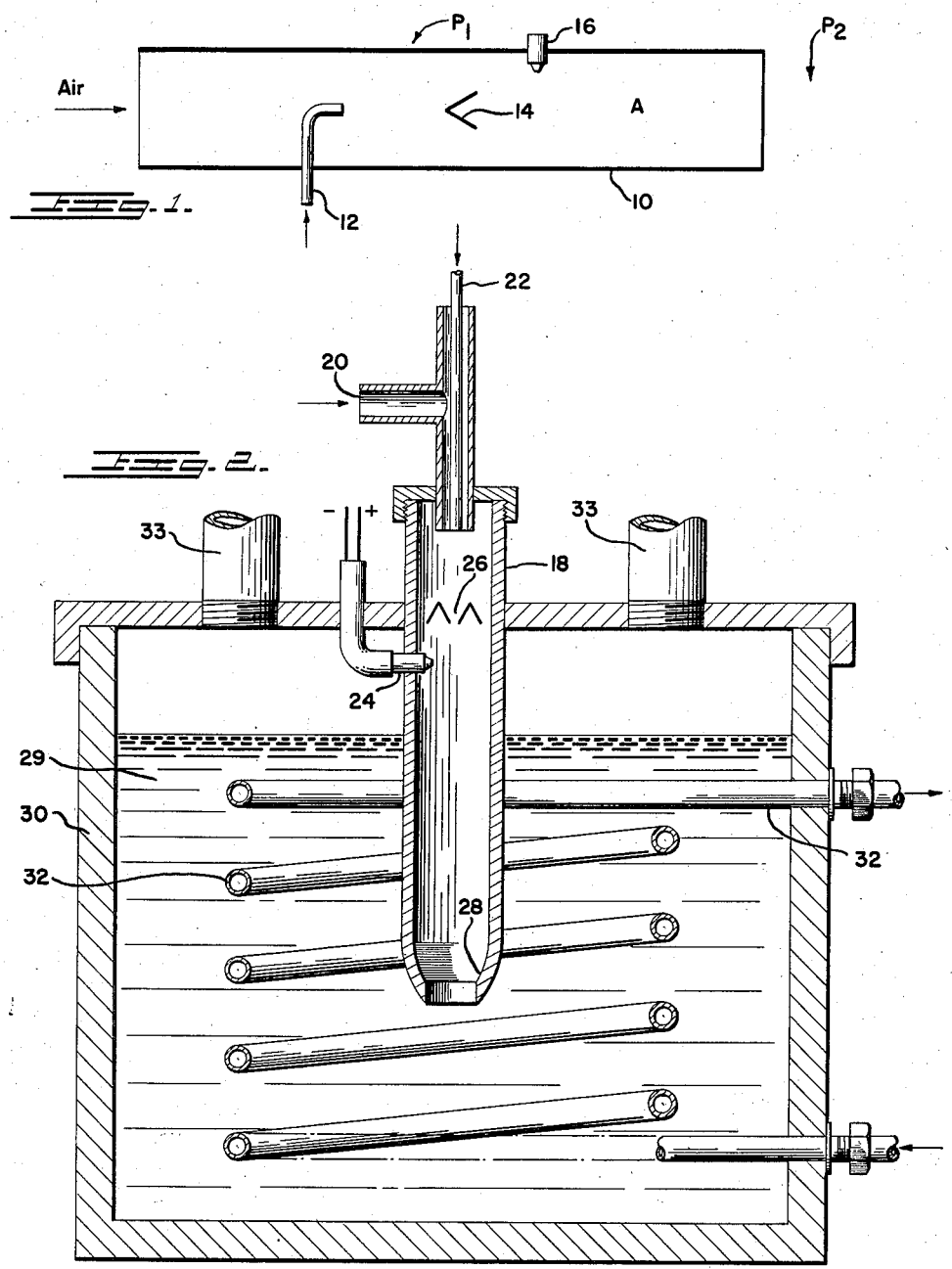
INVENTOR
JOHN B. FENN
BY Harold T. Stowell
ATTORNEY

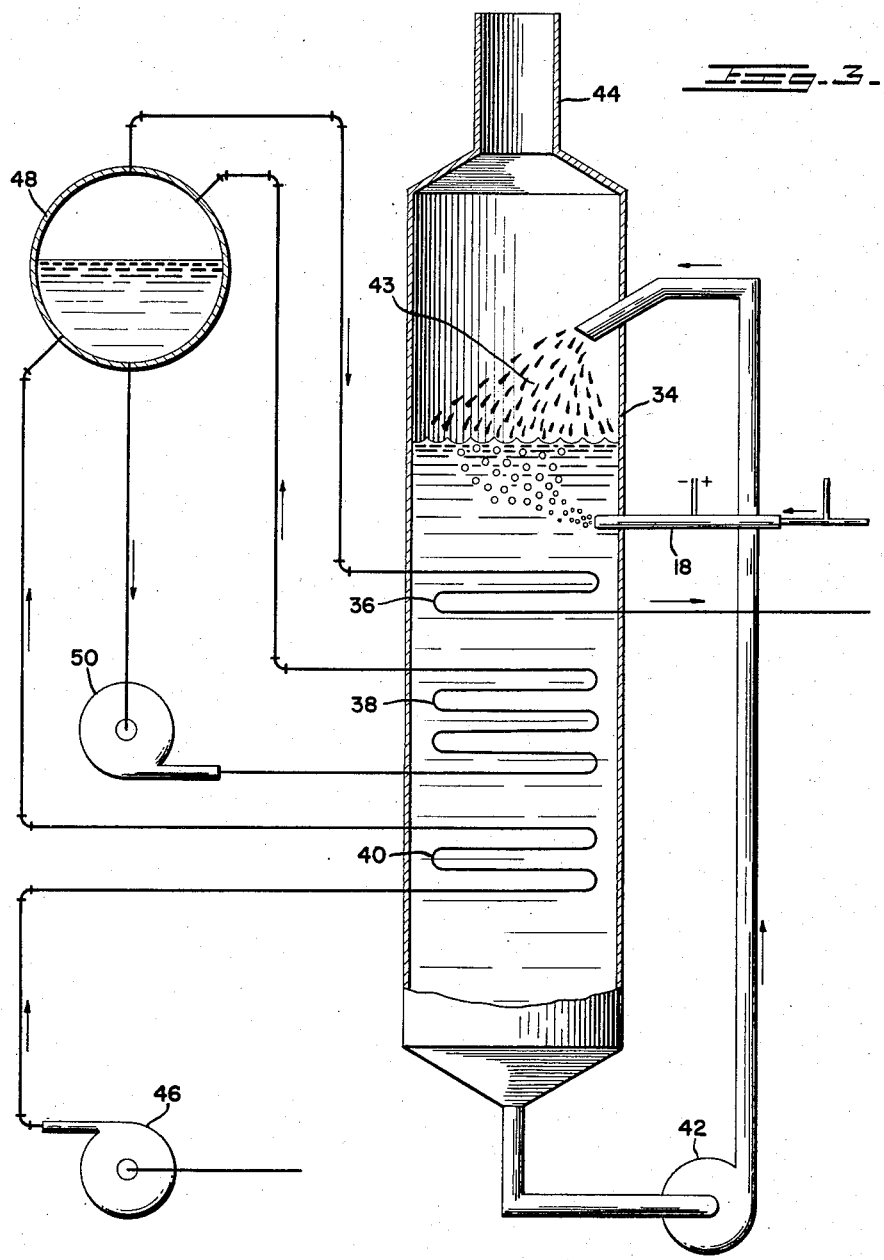

United States Patent Office 2,878,644
Patented Mar. 24, 1959

2,878,644

SONIC VELOCITY SUBMERGED COMBUSTION BURNER

John B. Fenn, Princeton, N.J., assignor to Experiment Incorporated, Richmond, Va., a corporation of Virginia Application May 1, 1956, Serial No. 581,953

3 Claims. (Cl. 60—39.57)

This invention relates to methods and apparatus for heat and power generation and more particularly to new and improved submerged combustion heat and power generation.

A large portion of the energy utilized today is generated by the combustion of carbon-containing fuels to the production of hot combustion gases and a large portion of such utilization involves a transfer of heat from the hot combustion gases directly to a solid body. Since, as is well-known, the transfer of heat from a gas directly to a solid is relatively slow, a tremendous amount of work has been done for the purpose of improving gas to solid heat transfer rate and efficiency. In most instances such factors as the physical properties of available construction materials, the temperature available in the heating gases, the available space, etc., limit the efficiency of the gas to solid heat transfer.

Attempts to overcome these problems and to provide for more efficient utilization of fuels in heat and power generation have resulted in the development of submerged combustion burners wherein the transfer of heat takes place directly from the hot combustion gas to a liquid, preferably inert and non-volatile, which liquid may be directly or indirectly utilized to heat the object to be heated or for power generation.

Notwithstanding the many advantages which are obtained from submerged combustion heat and power generation, such processes have not found commercial utility due to the inherent and heretofore unsolved problem of satisfactorily maintaining submerged combustion without interference from physical disturbances acting through the heat transfer liquid.

It is, therefore, a primary object of this invention to provide a method and apparatus in which the efficient heat transfer by direct contact between hot combustion gases and a liquid is made available for general use.

It is a further object to provide a submerged combustion system that is efficient in operation, relatively inexpensive to manufacture and maintain, and suitable for both large and relatively small scale industrial and commercial applications.

A further object of the invention as applied to the generation of steam for power purposes is to reduce the size of the apparatus and the space occupied by it as compared with the apparatus now in use for the generation of the same amount of steam power by the use in combination of a choked fuel burner and heat transfer from the combustion gases thereof directly to a heat transfer liquid.

Another object is to provide a submerged combustion heat and power generation system wherein the operation of the burners is wholly independent of fluctuations in the pressure of the heat transfer liquid, bumping of the liquid, and other conditions which adversely affect efficient operation of combusters utilized in submerged combustion systems.

These and other objects and advantages are provided by the present invention which generally comprises maintaining the combustion of a fuel in a combustion zone, directly introducing the hot combustion gases into a body of heat transfer liquid at least at sonic velocity whereby the combustion of the fuel is maintained independent of conditions in and surrounding the heat transfer liquid, and by heat exchange apparatus including a container, a body of heat transfer liquid in said container, means for directing heat from the body of liquid and means for introducing hot combustion gas into the liquid, wherein said means for introducing heat into said liquid comprises a choked fuel burner positioned to deliver combustion gases directly into said container below the liquid level therein.

Throughout the specification and claims, the term "choked fuel burner" is applied to burners characterized by the fact that combustion of the fuel takes place within the tube of the burner and the combustion products or gases issued from the burner at sonic velocity or attain sonic velocity at some point within the burner tube so that the operation of the burner is independent of conditions existing downstream of the point where the combustion gases are sonic.

Choked fuel burners not only permit greater rates of heat release in smaller combustion chambers but prevent any pressure fluctuations due to the bubbling of the hot combustion gases through the liquid from being transmitted to the combustion zone and disturbing the combustion process. Pressure fluctuations in the combustion zone directly interfere with the combustion process and may cause a burner to blow out. Moreover, uneven combustion causes fluctuations in the fuel and air feed to the burner which accentuate the uneven burning requiring continuous adjustments of the fuel and air supply.

It has been found that by operating submerged combustion burners to provide sonic velocity in the exhaust, very smooth combustion can be maintained irrespective of any pressure fluctuations due to fluid motion in the batch. A still further advantage accruing from the use of at least sonic exhaust velocity from the burner is the increased agitation of the heat transfer liquid which results in better heat transfer from the gas to the heat transfer liquid and from the heat transfer liquid to the object to be heated.

The invention will be more particularly described with reference to the illustrative embodiments of the invention wherein:

Fig. 1 is a diagrammatic illustration of a straight tube type burner suitable for operation under choked conditions;

Fig. 2 is a diagrammatic illustration of a submerged combustion system employing a choked burner having a converging outlet nozzle; and Fig. 3 is a diagrammatic illustration of a steam generation plant in which the hot combustion gas is contacted with both a body and a shower of the heat transfer liquid.

As hereinbefore described, choked conditions exist when the exhaust gases issuing from the burner are at least at sonic velocity or where the burner is provided with a converging throat wherein the exhaust gases attain sonic velocity.

A burner of this type is illustrated in Fig. 1 wherein the burner comprises a cylindrical pipe 10 into which a flow of air is supplied from a compressor or the like. Fuel at stoichiometric or near stoichiometric ratio is injected into the burner at 12. A flame holder 14 is provided in the burner to permit stabilization of the flame front resulting after ignition by electrical resistance type ignitor 16. Combustion proceeds to completion in zone A and the hot combustion gases are expelled from the burner exit at high linear velocities and temperatures.

In a burner of this type having an inside diameter of two inches, choking conditions are obtained when a stoichiometric mixture of air and pentane at mass flow rates of one and 0.0677 lb./sec., respectively, is introduced into the burner. Under these conditions combustion products will leave the exit at a temperature of 2500° K., a mass flow of 1.07 lb./sec., and at the local sonic velocity of about 3000 ft./sec.

In general, sonic velocity in the exhaust gas will be attained when the ratio of the upstream and exhaust static pressures $P_1/P_2$ is equal to about or exceeds two during operation of the burner.

Referring to Fig. 2, burner 18 receives compressed air at 20 and a gaseous fuel at 22 from a source of fuel and air not shown. The fuel-air mixture is ignited by a conventional electrical resistance ignitor 24 and the resulting flame is maintained and stabilized by flame holder 26.

The lower end of the burner converges inwardly at the tip 28 and the exhaust gases passing through the constriction are at sonic velocity.

Hot combustion gases after passing through the converging tip 28 are introduced below the surface of the body of heat transfer liquid 29 in the tank 30, the heat being transmitted through said heat transfer liquid to the conduit 32 and through its walls to a fluid such as water passing therethrough. As the gas bubbles up through the liquid, rapid heat exchange is obtained because of the large surface area of the bubbles in contact with the liquid so that thermal equilibrium is reached by the time the gas bubbles leave the liquid. In many instances equilibrium is reached with a bath depth of only a few inches. In addition to transferring heat to the bath liquid, the rise of the bubbles promotes vigorous agitation of the bath so that high heat transfer rates occur between the bath liquid and conduit 32. The gas after bubbling through the heat transfer liquid 29 passes out exhaust stacks 33.

It is, of course, not necessary that the conduit containing the fluid to be heated be immersed in the bath through which the gases are passed. It may be desirable to pump the liquid from the bath to a desired heat exchanging means and then to recycle it to the bath.

The above embodiment of the invention is particularly applicable when the temperature of the bath is such that the gases leaving the bath, at essentially the bath temperature, will not carry off appreciable quantities of heat which should not be so wasted. This will ordinarily be the case when it is desired to use the heat of combustion for low temperature applications such as space heating. For example, in household heating with hot water it is not usually desired to have the circulating water any hotter than 200° F. In such an application, therefore, the bath would operate only at about that temperature and the stack losses would be negligible as compared with present day practice. In point of fact, in ordinary furnaces and boilers the stack gas exit temperature is seldom below 400° F. so that the present invention permits a considerable increase in efficiency because of lower stack losses.

One application of the invention which is particularly attractive relates to steam generation for either power or process use. Because of the high rate of heat transfer between liquids and solid surfaces as compared with that between gases and solid surfaces, it is apparent that for a given rate of heat absorption by steam or water either the film temperature on the tubes, the total tube area, or both can be considerably decreased over the requirements of ordinary boiler practice. This leads to definite benefits both in materials requirements and in overall compactness of the installation. For a typical marine power plant installation savings of 50 percent in weight and 75 percent in volume can be accomplished by designing the steam generating system so that the combustion products transfer heat directly to a liquid and the liquid in turn transfers heat to the boiler tubes instead of the direct transfer of heat from combustion gases to boiler tubes. The invention permits taking advantage of the extremely high space heat releases which as hereinbefore described are available from the operation of choked fuel burners. These high rates of release are of little import so long as the large heat transfer volumes required in orthodox boiler construction are necessary. However, the decrease in size of heat transfer space required by practice of the invention makes the application of high heat release rates worthwhile.

Fig. 3 shows one form of the invention as applied to the generation of steam. Burner 18 exhausts beneath the surface of liquid contained in chamber 34. As the liquid becomes heated by direct contact with the combustion gases it flows downward over superheater tube 36, generator tube 38 and preheater tube 40 and then on out of the chamber whereupon it is recirculated to the top of the chamber 34 by means of pump 42. The combustion gases after bubbling up through the bath of heat transfer liquid, flow through the shower 43 of the liquid and pass on out of stack 44. The water cycle is typical of ordinary boilers. Feedwater is introduced under pressure by means of feed pump 46, passes through preheater tube 40 on up to steam drum 48 from which it is pumped by circulator pump 50 through generator tube 38. The resulting mixture of steam and water flows into drum 48 where the water and steam are separated. The water recirculates and the steam flows through superheater tube 36 and on out to its destination, e.g. a turbine (not shown) as dry superheated steam. It is apparent that in a design of this type that heavy refractory-lined combustion chambers are not required. Since the bath temperature need be only slightly higher than the desired maximum steam temperature because of the excellent heat transfer coefficients between the liquid and the boiler tubes, no part of the apparatus need be in contact with high temperature gases except the liquid itself. Thus ordinary steel construction can be used throughout. Moreover, the danger of tube failure because of running dry or overheating is eliminated so that the adaptability to changing loads and the efficiency at part load operation should both be greatly improved.

The choice of the heat transfer liquid to be used in a particular installation will depend upon the circumstances. One requirement is that the vapor pressure of the liquid shall be fairly low at the temperatures at which the gases finally are exhausted. Otherwise, considerable loss of liquid due to vaporization will be encountered. Another consideration is that the liquid should be relatively inert to the action of the combustion gases so that decomposition or deterioration due to the formation of solids will not occur. It would be desirable to have a liquid which would not solidify even at ordinary ambient temperatures. However, it is sufficient for practical purposes to have the melting point only slightly below the lowest temperatures encountered in the cycle to be used. Obviously, liquids which would be corrosive to the materials used in the construction of the apparatus should be avoided. Even with the above limitations, however, there are many possible materials. For relatively low temperature applications, such as household heating, various salt solutions such as calcium chloride, sodium phosphate, sodium chloride, and many others are available. In addition, there are organic materials sufficiently stable and having low vapor pressures such as certain of the silicones, highly chlorinated diphenyl derivatives, esters such as dibutyl phthalate, and the like. For higher temperature applications, there are several eutectic salt mixtures which have sufficiently low melting points to be of use in practicing the invention. In particular, various nitrate and chloride mixtures are available. An example of such a salt mixture is one containing 40% $NaNO_2$, 7% $NaNO_3$ and 53% $KNO_3$. Low melting metals and alloys including those of lead, bismuth, zinc, tin and the like may be used. It is noted, however, that care must be taken in burning air fuel mixtures so that there is no excess oxygen present when metals are to be used. Otherwise, there would be considerable formation of metallic oxide in the bath.

Some of the principal advantages of the invention have been pointed out above and others will be apparent upon consideration. For example, with the high unit capacity of the apparatus, it is of interest to note that a sonic exhaust burner may be operated to develop about 200 million B.t.u. per cu. ft. of combustor volume per hour compared to about 150,000 B.t.u. for burners commonly used for power generation and that temperature equilibrium between the gas and the heat transfer liquid may be reached by passage of the gas through only a few inches of the liquid.

With reference to the high heat efficiency of the invention it is noted that the heating gas may be exhausted from the apparatus at a relatively low temperature.

The combustion gases do not come in contact with or contaminate the heated product, e. g. steam, uneven heating and high temperature gradients and resultant strain within the rigid structure of the apparatus are avoided, scaling due to contact of the combustion gases with solid heat transfer surfaces is avoided, excessively high temperatures and the use of refractories are avoided and heat insulation is relatively simple and inexpensive.

This application is a continuation-in-part of my application Serial Number 165,761, filed June 2, 1950 now abandoned.

I claim:

1. In a process for heat and power generation in which a liquid heat transfer medium is heated by direct contact with hot combustion gases, the steps comprising maintaining the combustion of a fuel in a confined space, accelerating the combustion gases to sonic velocity and then directly introducing the hot combustion gases into the heat transfer liquid.

2. In a process for heat and power generation in which a liquid heat transfer medium is heated by direct contact with hot combustion gases, the steps comprising maintaining the combustion of a fuel in a confined space, accelerating the hot combustion gases to sonic velocity and directly introducing the hot combustion gases at sonic speed into the heat transfer liquid.

3. The process defined in claim 1 wherein the combustion gases are thereafter passed upwardly through a spray of the heat transfer liquid.

References Cited in the file of this patent

UNITED STATES PATENTS

| | | |
|---|---|---|
| 971,724 | Brunler | Oct. 4, 1910 |
| 1,689,551 | Hammond | Oct. 30, 1928 |
| 2,159,759 | Doennecke et al. | May 23, 1939 |
| 2,598,544 | Holman et al. | May 27, 1952 |
| 2,601,000 | Nerad | June 17, 1952 |
| 2,642,850 | De Lancey | June 23, 1953 |
| 2,647,370 | Miller | Aug. 4, 1953 |
| 2,659,195 | Bolanovich | Nov. 17, 1953 |
| 2,677,368 | Janecek | May 4, 1954 |